(12) United States Patent
Bertezzolo (10) Patent No.: US 10,232,882 B2
(45) Date of Patent: Mar. 19, 2019

(54) ADJUSTABLE CHASSIS FOR A MOTOR VEHICLE

(71) Applicant: Matteo Bertezzolo, Villafranca di Verona (IT)

(72) Inventor: Matteo Bertezzolo, Villafranca di Verona (IT)

(*) Notice: Subject to any disclaimer, the term of this patent is extended or adjusted under 35 U.S.C. 154(b) by 30 days.

(21) Appl. No.: 15/513,015

(22) PCT Filed: Sep. 22, 2015

(86) PCT No.: PCT/IB2015/057297
§ 371 (c)(1),
(2) Date: Mar. 21, 2017

(87) PCT Pub. No.: WO2016/051311
PCT Pub. Date: Apr. 7, 2016

(65) Prior Publication Data
US 2017/0253271 A1 Sep. 7, 2017

(30) Foreign Application Priority Data
Sep. 29, 2014 (IT) .............................. VR2014A0236

(51) Int. Cl.
*B62D 21/20* (2006.01)
*B62D 21/14* (2006.01)
(Continued)

(52) U.S. Cl.
CPC ............ *B62D 21/14* (2013.01); *B62D 21/07* (2013.01); *B62D 21/12* (2013.01); *B62D 21/183* (2013.01);
(Continued)

(58) Field of Classification Search
CPC ...... B62D 21/14; B62D 21/12; B62D 21/183; B62D 21/07; B62D 63/02; B62D 21/01
(Continued)

(56) References Cited

U.S. PATENT DOCUMENTS 8,985,631 B2 * 3/2015 Garceau ................ B62D 21/02
280/781
2006/0219462 A1 * 10/2006 Martin .................. B62D 21/02
180/292

(Continued)

*Primary Examiner* — Toan C To
(74) *Attorney, Agent, or Firm* — Patshegen IP LLC; Moshe Pinchas (57) ABSTRACT

The present disclosure relates to a chassis (1) for a motor vehicle, comprising a passenger compartment cell (2), a front frame (3) and a rear frame (4), which are arranged along a longitudinal direction (100) of the chassis (1). The frame front (3) and the rear frame (4) each comprise two longitudinal members (31, 32; 41, 42) and a cross member (35; 45) forming a substantially C-shaped structure. The chassis (1) allows the adjustment of the track width and/or the pitch of the motor vehicle. To adjust the track width, the chassis (1) is adapted for the attachment of each longitudinal member (31, 32; 41, 42) of a frame (3, 4) to the passenger compartment cell (2) at a plurality of positions that are spaced apart in the transverse direction, in such a way as to allow an adjustment of the transverse distance between the two longitudinal members (31, 32; 41, 42). To adjust the pitch, each longitudinal member (31, 32; 41, 42) of a frame (3, 4) is provided with at least one attaching assembly (53) for attaching a suspension (7) of a respective wheel of the motor vehicle. The attaching assembly (53) is adapted for attaching the suspension (7) at a plurality of positions that are spaced apart in the longitudinal direction, in such a way as to allow an adjustment of the longitudinal distance of the suspension (7) from the passenger compartment cell (2).

15 Claims, 6 Drawing Sheets

(51) Int. Cl.
  *B62D 21/07* (2006.01)
  *B62D 21/12* (2006.01)
  *B62D 63/02* (2006.01)
  *B62D 21/18* (2006.01)

(52) U.S. Cl.
  CPC ............ *B62D 63/025* (2013.01); *B62D 21/18* (2013.01); *B62D 63/02* (2013.01)

(58) Field of Classification Search
  USPC .................................. 280/785, 788; 180/209
  See application file for complete search history.

(56) References Cited

U.S. PATENT DOCUMENTS

| | | | |
|---|---|---|---|
| 2015/0354149 A1* | 12/2015 | Dahm ................. | E01C 19/4886 404/98 |
| 2017/0174263 A1* | 6/2017 | Thompson ............. | B62D 21/14 |
| 2018/0022387 A1* | 1/2018 | Ta ......................... | B60K 5/1275 |
| 2018/0135306 A1* | 5/2018 | Jeffs ....................... | B60L 11/18 |

* cited by examiner

ADJUSTABLE CHASSIS FOR A MOTOR VEHICLE

The present invention refers to a chassis used for various types of motor vehicles, which is described here by way of example and not limitation for a sports car such a grand tourer or Cabriolet car.

In the field of the motor vehicles there is a market segment that requires vehicles that are as customizable as possible and that can be constructed according to the specific needs of the customer. Current production processes are not very versatile and are struggling to meet this requirement, except with high costs for the customer. Such customization needs, nowadays, are particularly true in the field of sports cars for users who seek to meet specific driving needs and personal aesthetic solutions.

The present disclosure starts from the technical problem of providing a method to construct a motor vehicle which allows to overcome the drawbacks of the prior art and/or to provide additional advantages.

One solution to the technical problem is to offer a chassis for a motor vehicle according to independent claim 1. Another solution to this technical problem is provided by a chassis for a motor vehicle according to independent claim 7. These solutions share a common inventive concept to allow adjustment of the dimensional characteristics of the motor vehicle (respectively, the track width and pitch), by using a chassis that is arranged with a plurality of predefined positions for attaching of parts. The technical problem is also solved by a method of construction according to claim 13 or claim 14.

Specific embodiments of the object of the present disclosure are defined in the corresponding dependent claims.

One aspect of the solution provided by the present disclosure are the provision of a chassis that is arranged in order to be mounted in a plurality of configurations, allowing an adjustment of some of its substantial characteristics according to specific requirements. Specifically, it enables the adjustment of the track width and/or the pitch of the motor vehicle.

In particular, the chassis comprises a passenger compartment cell, which is intended to accommodate a driver and at least one passenger, and two frames, which are arranged in front of and behind the passenger compartment cell, respectively.

At least one of the two frames provides a possibility of adjustment.

In a first embodiment, at least one of the two frames is adjustable in width: it comprises two longitudinal members, which can be attached to the passenger compartment cell in a position selected among a plurality of preset positions that are transversely spaced apart. This is useful both for the adjustment of the width of the adjustable frame and, consequently, of the track width of the motor vehicle (i.e., the distance between the centres of the wheels of the same axis), and for varying the space available for housing the propulsion system and/or ancillary systems of the motor vehicle (for example, cooling system, electrical system, control units, sensors, tubes, etc.), depending on the desired track width and the space actually required by the engine and trim solution (also called "handling") that have been chosen for the motor vehicle.

In a specific embodiment also the length of the frame is adjustable, thanks to the fact that an end cross member of the frame can be mounted at a plurality of preset positions that are longitudinally spaced apart.

In another embodiment, that can be independent of the first embodiment mentioned above, at least one of the two frames is adjustable as regards the position of the wheel suspension: the frame comprises two longitudinal members and the suspension of each wheel can be attached on the respective longitudinal member at a position selected among a plurality of preset positions that are longitudinally spaced apart. This is useful to adjust the pitch of the motor vehicle (i.e., the distance between the axis of the front wheels and the axis of the rear wheels), depending on the desired value Also the dampening system of the wheel is fixable at a chosen position between a plurality of predefined positions. This is useful to adjust the position of the shock absorber according to the position of attachment of the suspension, the type of shock absorber, and the selected trim.

In specific embodiments, the above possibilities of adjustment or variation of the attaching of the frames, the suspensions and the shock absorbers, at a plurality of predefined positions, are implemented by means of attaching plates or adjustment plates, which are provided with a plurality of holes or seats suitable to receive attaching members such as screws, bolts or the like. The predefined locations are determined by the holes or seats: depending on the holes or seats used for the attaching members, an attachment at a specific predefined location is obtained.

In particular, the front frame and the rear frame are both adjustable, that is, the track width and/or position of the suspensions are adjustable for both of the frames. In practice, the object of the present disclosure is useful to provide a modular chassis, which, thanks to its technical characteristics, is adaptable to many configurations and allows a substantial customization of the chassis (and then of the motor vehicle) according to the needs.

The ability to adjust the distances between the longitudinal members of the front frame and/or the rear frame, as well as the position of the cross member of the chassis itself, allows the dimensions of the internal space to be varied according to the configuration of the propulsion and transmission, of housing of the ancillary systems, and of the trim (handling) that have been selected for the vehicle.

The front frame and/or rear frame can accommodate indistinctly and simultaneously heat and electrical engines, which are arranged longitudinally or transversely. This is facilitated also by the possible presence of a central tunnel in the passenger compartment cell, which allows the housing of a transmission shaft.

The front frame and the rear frame can also accommodate transverse and/or longitudinal, both manual and automatic gear shifts, coupled to the propulsion systems, or may be separated therefrom, and do not need to be located in the frame housing the propulsion system.

Depending on the configurations selected for the propulsion units, the front frame and the rear frame are able to also accommodate ancillary systems of the motor vehicle, such as a cooling system, an electrical system, control units, sensors, pipes, etc.

As already mentioned, the front frame and the rear frame are used to configure the ideal pitch and the track width as a function of the characteristics chosen for setting up the chassis of a vehicle, such as the arrangement of the propulsion system, the choice of the traction type, the arrangement of ancillary systems, the power supply type, the shape of the body, the system of suspensions, etc. This is possible, in particular, through the adjustment of the anchorage of the suspension system/shock absorbers at different distances from the passenger compartment cell (allowing the variation of the pitch of the motor vehicle) and/or by adjusting the distance between the longitudinal members of the frames (allowing the modulation of the track width).

The passenger compartment cell, in one embodiment, comprises a central tunnel, a right compartment for power supply units and a left compartment for power supply units. This allows to accommodate liquid fuel tanks, gaseous fuel tanks, and battery packs for electric power supplies. These can also be accommodated simultaneously. Therefore, the chassis can be configured to accommodate simultaneously propulsion units with different power supplies.

Further characteristics, advantages and methods of use of the object of the present disclosure will become more apparent from the following detailed description of an embodiment thereof, presented by way of example and not of limitation. Reference will be made to the accompanying drawings, in which.

Figure 1:
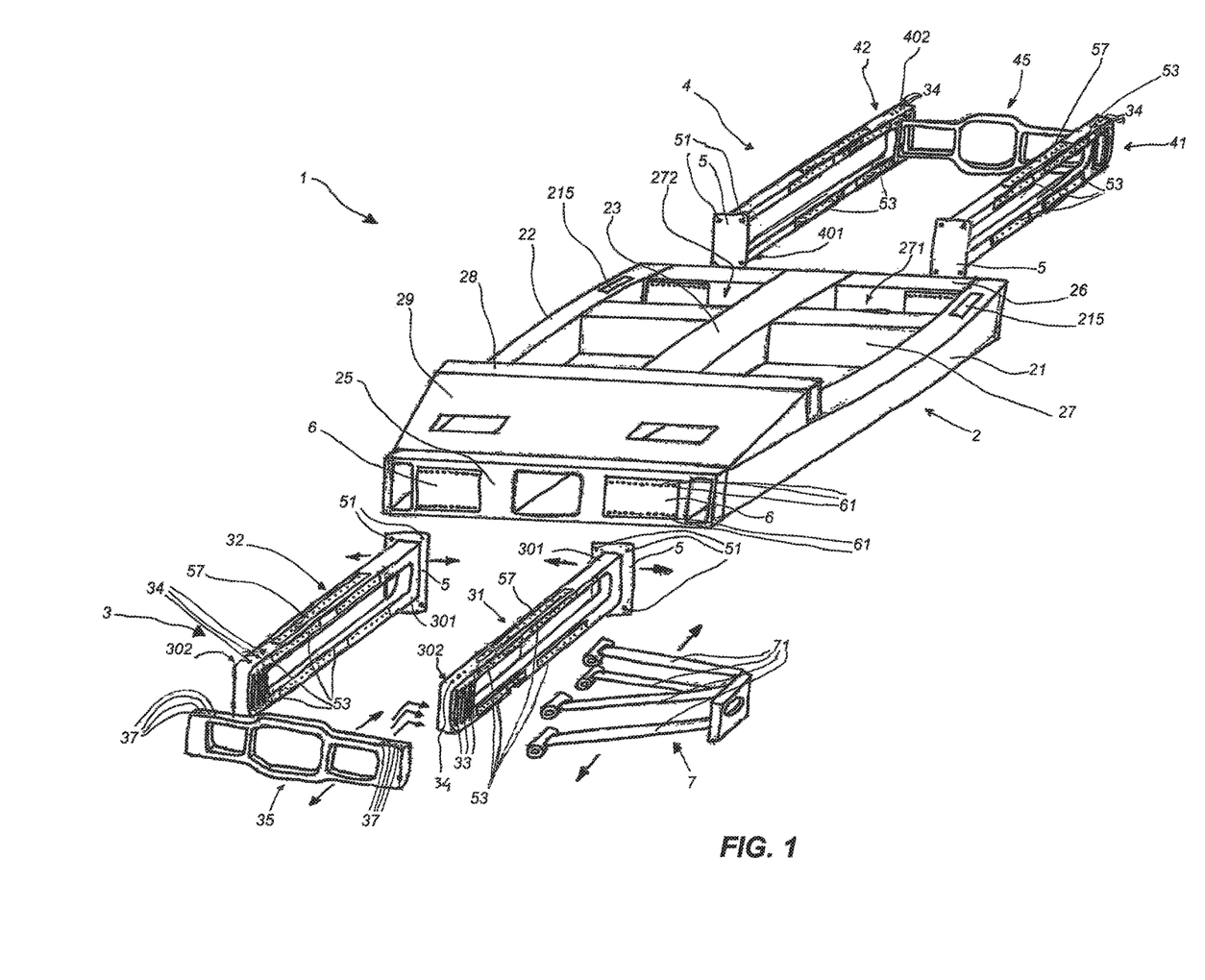
FIG. 1 shows a front perspective view of a chassis for a motor vehicle according to the present disclosure in a partially assembled condition.
Figure 2:
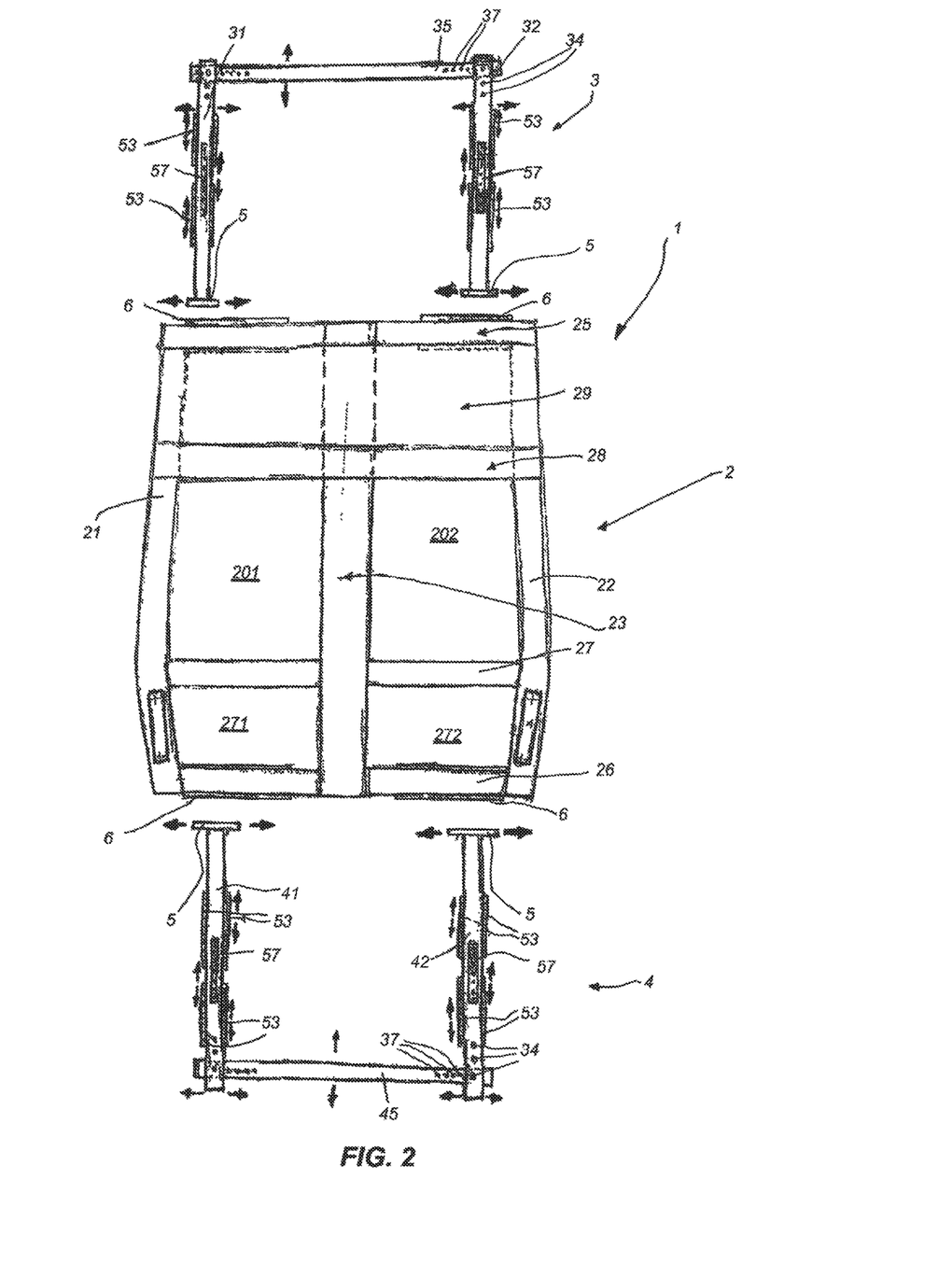
FIG. 2 shows a top view of the chassis of FIG. 1 in a partially assembled condition.
Figure 3:
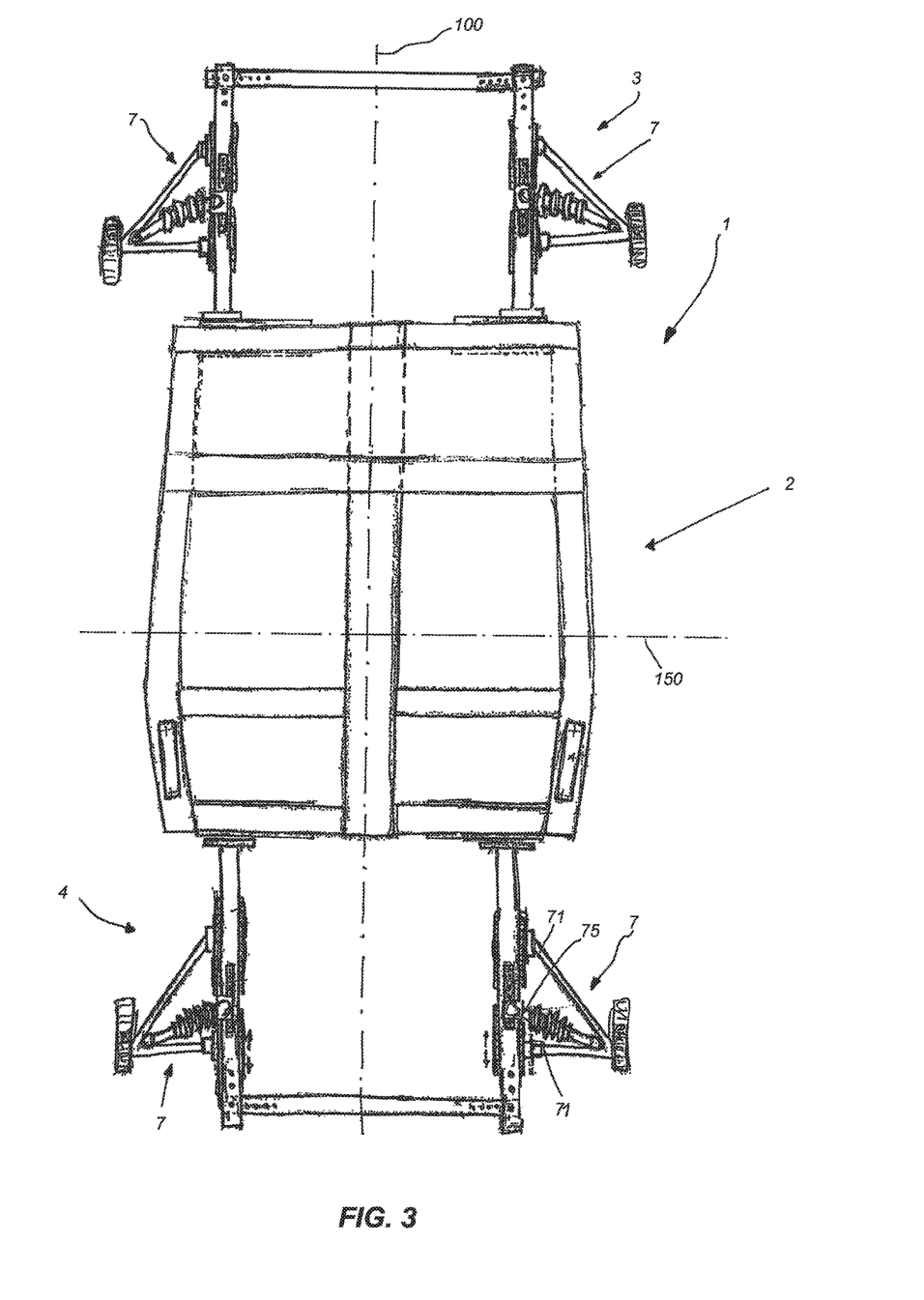
FIG. 3 shows a top view of the chassis of FIG. 1 in a mounted condition and comprising suspensions and shock absorbers.
Figure 4:
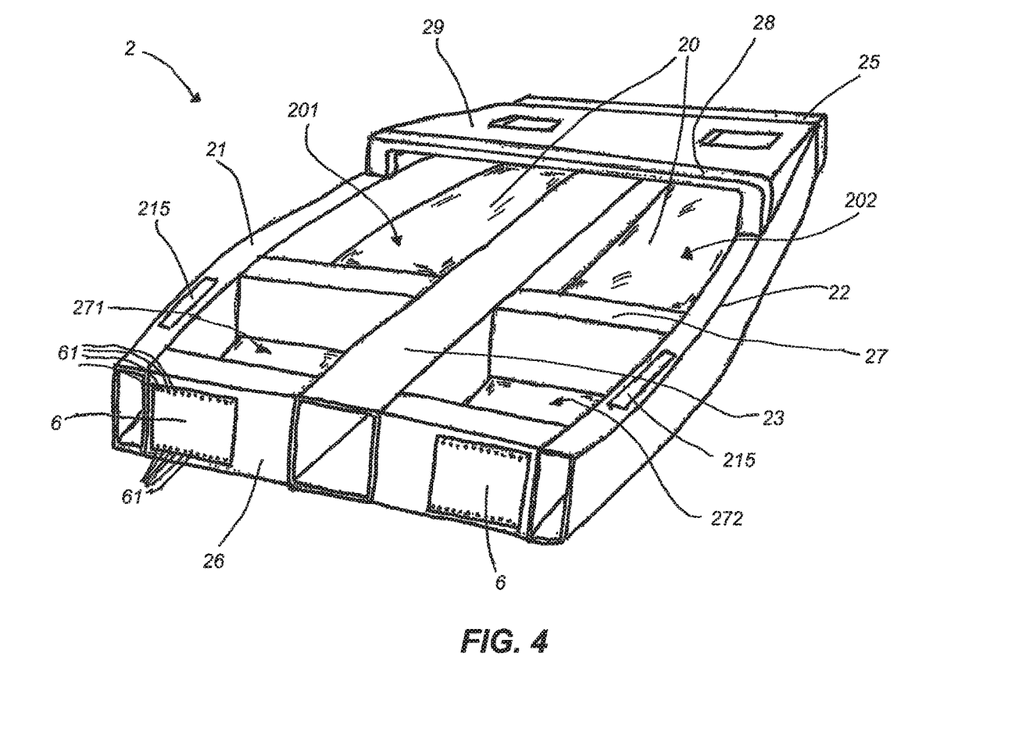
FIG. 4 shows a perspective view from behind of a component of the chassis of FIG. 1.
Figure 5:
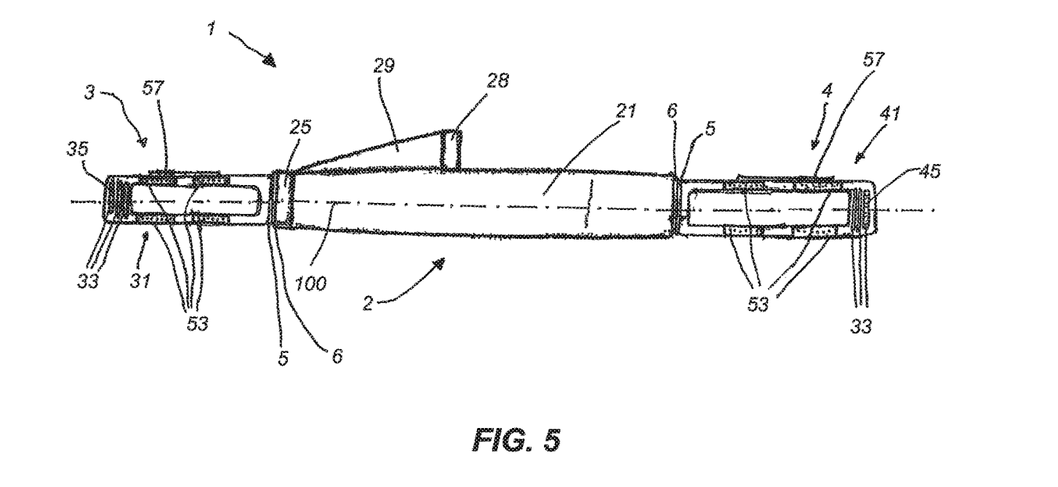
FIG. 5 shows a side view of the chassis of FIG. 1 in an assembled condition.
Figure 6:
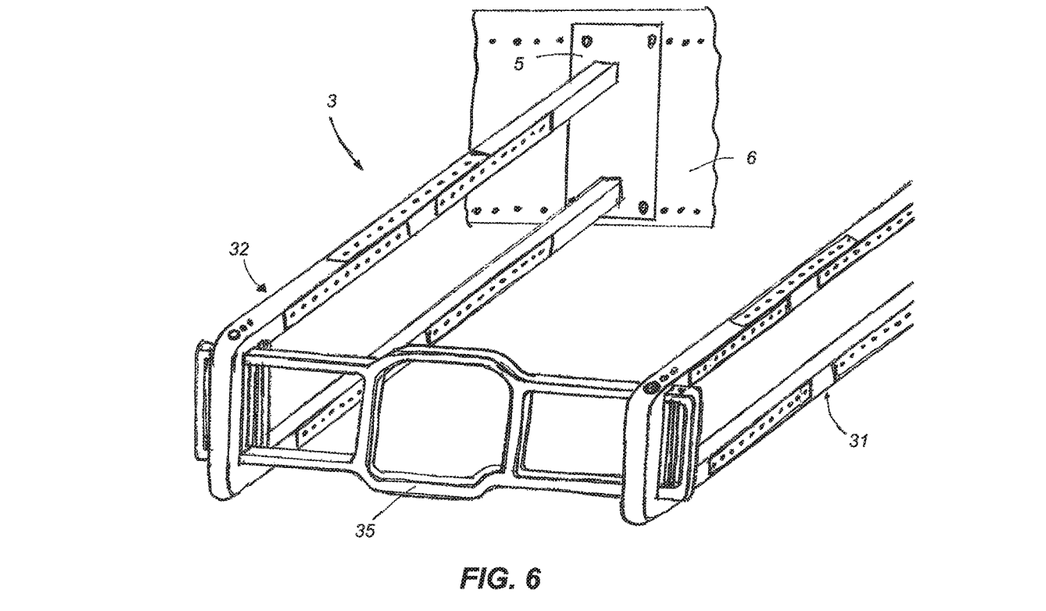
FIG. 6 shows a perspective view of a detail of the chassis of FIG. 1 in a assembled condition.
Figure 7:
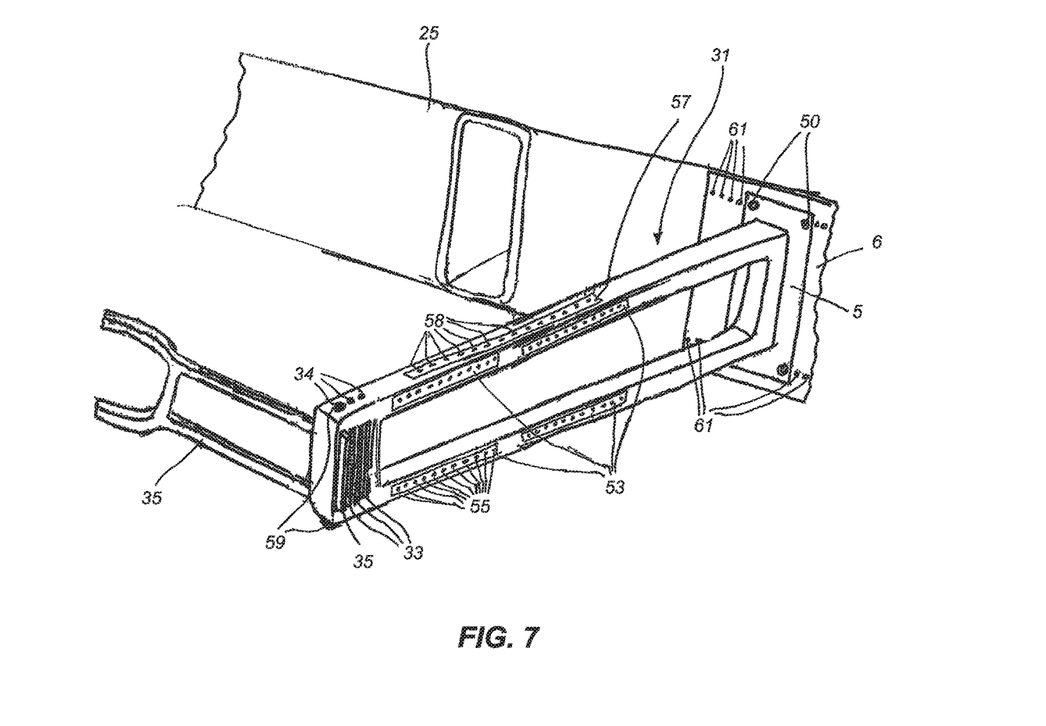
FIG. 7 shows another perspective view of a detail of the chassis of FIG. 1 in an assembled condition.
Figure 8:
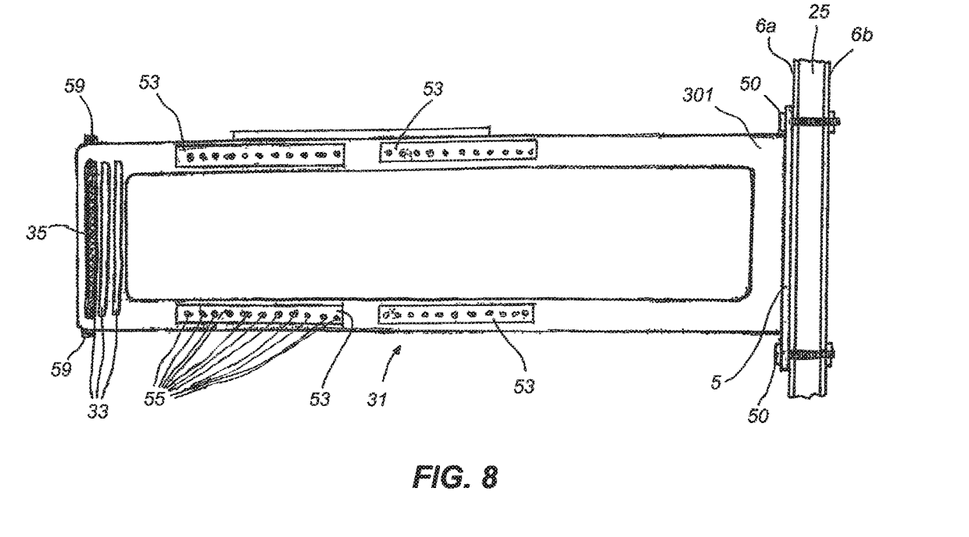
FIG. 8 shows a side view of the detail of FIG. 7.
Figure 9:
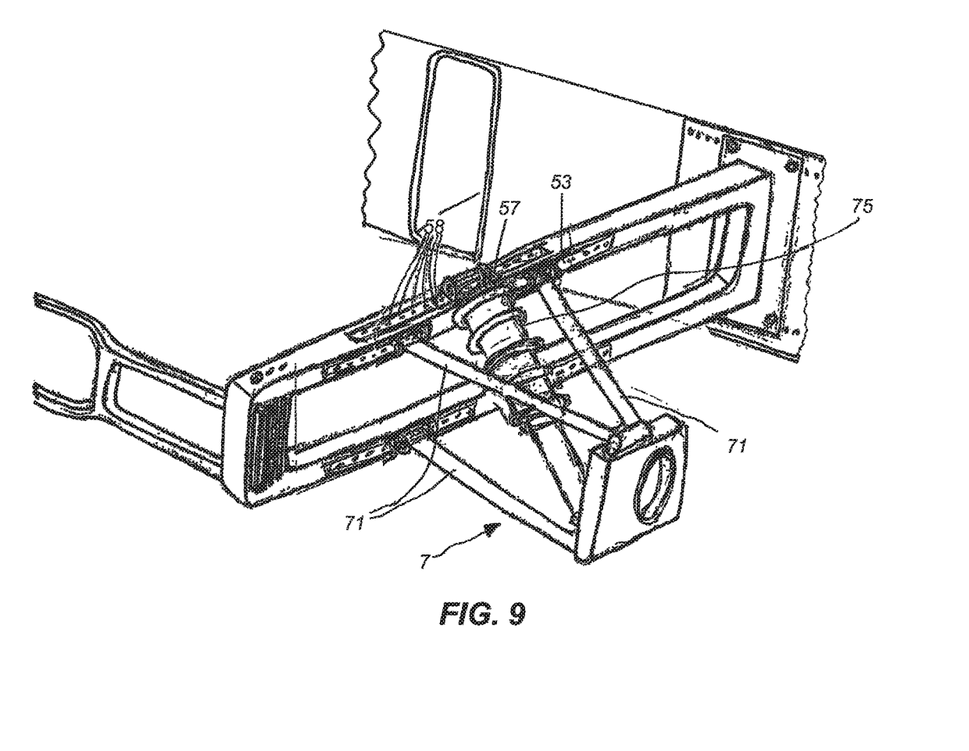
FIG. 9 shows a perspective view of the detail of FIG. 7; further comprising suspensions and shock absorbers.

With reference to the attached figures, a chassis for a motor vehicle according to the present disclosure is generally indicated with the reference number 1. The chassis 1 is shown in FIG. 1 in disassembled condition, and is shown in FIG. 3 in the assembled condition and provided with other components of the motor vehicle.

The chassis 1 is a specific application to realize a car such as a so-called grand tourer, Sport, Cabriolet car, or for a sports car in general. Therefore, in the following reference will be made to a sports car, but it should be understood that the present invention is also applicable to another motor vehicle.

In particular, the chassis 1 can find application in all cases in which the desire is to provide a client user with the possibility to choose some characteristics of the car (such as the track width, the pitch, the structure, the propulsion system, the type of traction, the shape of the body, etc.) within certain intervals, before constructing the car. The chassis 1 is therefore useful for giving a wide possibility of personalization for the car to be realized.

The chassis 1 is a load-bearing structure of the car: all the other components of the car are attached to the chassis 1 either directly or indirectly. In particular, the chassis 1 is made of aluminium.

The chassis 1 comprises a passenger compartment cell or central passenger cell 2, a front frame 3 and a rear frame 4; the frames 3,4 are attached to the passenger compartment cell 2. The passenger compartment cell 2 is interposed between the front frame 3 and rear frame 4, along a longitudinal direction of the chassis 1. In particular, the chassis 1 has a central longitudinal axis 100 (FIG. 3), which passes through the passenger compartment cell 2, the front frame 3 and the rear frame 4. A transverse direction of the chassis is also identified, the transverse direction being orthogonal to the longitudinal direction. To exemplify this transverse direction a transverse axis is shown in FIG. 3 with the reference number 150.

In the context of the present disclosure, the terms "front", "rear" and other similar spatial terms should be construed with reference to the motor vehicle to be obtained and to its normal direction of travel.

Similarly, the longitudinal direction 100 substantially corresponds to a direction in front—behind the motor vehicle. The transverse direction is substantially horizontal when the vehicle is on level ground.

Specifically, the passenger compartment cell 2 has two seats 201, 202 and is designed to accommodate a driver and a passenger. The passenger compartment cell 2 comprises two load-bearing longitudinal beams or longitudinal members 21, 22, which are arranged on the long sides of the passenger compartment cell 2. The two longitudinal beams 21, 22, also called "external tunnels", have a hollow interior and are open-ended, so as to allow the passage of pipes and cables from the front frame 3 to the rear frame 4 and vice versa.

The passenger compartment cell 2 also comprises a central longitudinal member 23, also with a load-bearing function, which is disposed along a central longitudinal axis of the passenger compartment cell 2. The central longitudinal member 23, also called "central tunnel", has a hollow interior and is open-ended, so as to allow a connection between the front frame 3 and the rear frame 4. In the upper part, the central longitudinal member 23 has anchorages (not shown) to accommodate ancillary elements such as piping, cables, linkages, buttons, levers, etc.

The central longitudinal member 23 may be dimensioned to allow the housing of components of the propulsion system of the car therewithin. For example, it can alternatively accommodate a transmission shaft, a liquid fuel tank, battery packs for electric power supply, one or more cylinders of gaseous fuel (which are positionable longitudinally).

The passenger compartment cell 2 includes two front and rear cross beams or cross members 25, 26, which are anchored to the ends of the longitudinal beams 21, 22 and that can be shaped centrally to secure the central longitudinal member 23. The cross members 25, 26 may also be shaped at their ends to accept and retain the longitudinal beams 21, 22.

In particular, the front transverse beam or front cross member 25 is provided with symmetrical holes or seats (not shown, but arranged one on a right side and the other one on a left side), to allow the attachment of a steering box to a steering column. The symmetrical holes allow to realize a car with left-hand or right-hand drive, according to the needs. In other words, the chassis 1 is arranged for both driving positions.

The rear transverse beam or rear cross member 26 closes the passenger compartment cell 2 at its end. The passenger compartment cell 2 comprises an intermediate bulkhead or intermediate cross member 27, which may possibly have a load-bearing function and which is attached immediately behind the seat anchorages for driver and passenger. The intermediate cross member 27 is disposed perpendicularly to the central longitudinal member 23 and is shaped in such a way as to pass the central longitudinal member 23 itself.

The intermediate cross member 27, the rear transverse beam 26 and the end parts of the longitudinal beams 21, 22 delimit two compartments 201, 202, which are separated from the central longitudinal member 23. The two compartments 271, 272 are usable for power supply units, i.e., they are intended to house tanks for liquid fuels, tanks for gaseous fuels and/or battery packs for electric power supply.

The passenger compartment cell 2 comprises a floor 20, which is attached to the lower part of the longitudinal beams 21, 22, the central longitudinal member 23, the transverse beams 25, 26, and the intermediate cross member 27. The floor 20, at the area immediately in front of the intermediate cross member 27, has anchorages for the seats for the driver and the passenger. In addition, the floor 20, at the part closest to the front transverse beam 25, that is, the housing areas for the feet of the driver and the passenger, can be equipped with anchorages for a pedalboard (not shown). These anchorages can be either on the right or the left, to be used according to the left-hand or right-hand driving position. The anchorages of the pedalboard can be configured in such a way as to allow adjusting the attachment of the pedalboard itself forward or backward with respect to the seats.

The passenger compartment cell 2 comprises a bridge cross member 28, which possibly also has a load-bearing function. The bridge cross member 28 is attached to the longitudinal beams 21, 22 and has a bridge shape therebetween, defining the upper part of the passenger compartment cell 2. The bridge cross member 28 is positioned and shaped so as to be able to house the steering column, the on-board instrumentation, a windscreen chassis, and a dashboard. The outer ends of the bridge cross member 28 have anchorages for mechanisms for opening and closing of the doors of the car.

Finally, the passenger compartment cell 2 has a bridge bulkhead 29, possibly with load-bearing function, which is attached to the bridge cross member 28, to the front transverse beam 25, and to the front inside or outside of the longitudinal beams 21, 22. The bridge bulkhead 29 has a shape sloping down towards the front transverse beam 25 and the longitudinal beams 21, 22. The bridge bulkhead 29, in particular at the part close to the front transverse beam 25, has anchorages and housings for the dashboard, a windscreen chassis and the pedalboard with attack on the floor. The bridge bulkhead 29 is also designed for an anchoring of the right and left pedalboard depending on the chosen driving position.

In essence, the passenger compartment cell 2 is a tub-shaped chassis, having a rigid structure that delimits the space for the driver and the passenger and, moreover, is designed to receive and attach driving devices and accessories, the on-board instrumentation and accessories, the tanks or other power supply units, the body or its parts. For example, the longitudinal beams 21, 22 have, on their upper face, anchors 215 for attaching a roll-bar.

The front frame 3 and the rear frame 4 each comprise two longitudinal members, which are arranged longitudinally and are attached to the passenger compartment cell 2, and a cross member that is orthogonal to the longitudinal members and is supported by the latter. In essence, the two longitudinal member and the cross member form a C-shaped structure, which is attached to the passenger compartment cell 2 to obtain a perimetral chassis substantially shaped as a quadrilateral, in particular rectangular in shape.

Front wheels and rear wheels of the car are mounted to the front frame 3 and to the rear frame 4, respectively. The frames 3, 4 may include, at their lower part, supports the propulsion systems of the car. For example, such supports are welded or fastened to the longitudinal member by means of bolts or similar anchoring systems. In the illustrated embodiment, both the front frame 3 and the rear frame 4 are adjustable, as described below. In an alternative embodiment, only the front frame 3 or only the rear frame 4 is an adjustable frame.

As mentioned, the front frame 3, or adjustable front subframe, includes two longitudinal member 31, 32 and a cross member 35, or front crossbar. Each longitudinal member 31, 32 has a first end region 301 that is attached to the passenger compartment cell 2, in particular to the front transverse beam 25.

According to an aspect of the present disclosure, the chassis 1 is arranged to allow the attaching of each longitudinal member 31, 32 at a plurality of predefined positions, which are spaced apart in the transverse direction. In other words, during assembly of the chassis 1 it is possible to select the attaching position of each longitudinal member 31, 32 on the front beam 25 and the distance of the longitudinal member 31, 32 from the longitudinal central axis 100 This allows adjusting the transverse distance between the two longitudinal members 31, 32, that is, the width of the front frame 3, also according to the value of the front track width to be obtained.

To allow this adjustment, the first end region 301 of the longitudinal member 31, 32 comprises an anchor member and the front transverse beam 25 comprises a plurality of seats adapted to receive the anchor member; each seat defines a respective predefined position of the longitudinal member 31, 32. In an alternative and opposite embodiment, the anchor member is on the front transverse beam and the plurality of seats are on the first end region 301 of the longitudinal member.

In the illustrated embodiment, the anchor member is a plate 5 attached or welded to the body of the longitudinal member 31, 32. The anchor plate 5 is substantially polygonal in shape (particularly rectangular) and has at least four passing-through holes or slots 51 for fastening members such as screws or bolts, or the like.

The plurality of seats is defined by an adjustment plate 6 polygonal in shape (particularly rectangular), arranged on the front transverse beam 25: the adjustment plate 6 has at least two parallel series of holes or slots 61 for screws, bolts or other similar anchoring systems. In particular, the holes 61 may be threaded have the same diameter and, where present, the same thread.

For example, each set comprises at least three holes 61, which are spaced from one another in the transverse direction. The vertical distance between the series of holes 61 and the pitch of the series is selected in such a way that, when the anchor plate 5 rests on the adjustment plate 6, the holes 51 of the anchor plate 5 meet corresponding holes 61, so as to insert screws, bolts or other similar anchoring systems 50 to realize the attaching of the anchor plate 5 to the adjustment plate 6.

Thanks to the number of holes 61, the anchor plate 5 can be attached in a plurality of predefined positions on the adjustment plate 6: there is a plurality of holes 61 that correspond to the passing-through slots 51 of the anchor plate 5 (and to the attaching members 50 inserted in the slots 51) and allow the joining of the latter at a preset position. Therefore, a set of holes 61, which coincide with the passing-through slots 51, defines a seat adapted to receive the anchor plate 5; it is not necessary that the seat is physically defined by a recess or other physical delimitation.

The preset positions are at least two, but preferably are in greater numbers, for example ten. The distance between the holes 61 is about 0.5 cm, or even one centimetre or more centimetres. For example, the distance between the extreme positions is 50 cm.

Alternatively to the passing-through slots 51, the anchor plate 5 is provided with protruding threaded pins, which are attached to the anchor plate 5 itself and are intended to be inserted and bolted within the holes 61 of the adjustment plate 6.

Alternatively, to an attachment or welding, the anchor plate 5 can be done from a unique casting with the respective longitudinal member 31, 32 (also together with said protruding threaded pins), or obtained from an unique casting with threaded pins and then welded or anchored to the longitudinal member 31, 32 The adjustment plate 6 can also be done from a unique casting along with the front transverse beam 25 or be an integral part of the latter.

As shown in the figures, the front transverse beam 25 is provided with two adjustment plates 6: one for the left longitudinal member 31 and the other for the right longitudinal member 32. Each allows adjusting the attaching position of the respective longitudinal member.

To obtain a more secure connection and which better distributes the load on the transverse beam 25, each adjustment plate 6 is double, that is, a first plate 6a is attached to the outer side of the front transverse beam 25 (i.e., on the face turned towards the front frame 3) and a second plate 6b is attached to the inner side of the front transverse beam 25 (i.e., on the face turned towards the interior of the passenger compartment cell 2). The first plate 6a and the second plate 6b are parallel and with the holes 61 aligned with each other, in such a way that the screws or bolts or other similar anchoring systems 50 enter the first plate 6a and come out from the second plate 6b after having crossed the whole the thickness of the front beam 25.

Each longitudinal member 31, 32 has also a second end region 302 that supports the cross member 35. To facilitate the above-mentioned adjustment of the transverse distance between the two longitudinal members 31, 32, the second end region 302 comprises a passing-through slot or opening 33 that is configured to receive a respective end of the cross member 35. In other words, the cross member 35 is inserted into the passing-through slot 33 orthogonally to the longitudinal member 31, 32, and then is supported by the longitudinal member itself.

The passing-through slot 33 and the end of the cross member 35 are dimensioned such that the cross member 35 can slide within the passing-through slot 33 perpendicularly to the longitudinal axis 100 of the chassis 1. During the adjustment of the transverse distance between the two longitudinal members 31, 32, therefore, the cross member 35 does not prevent the longitudinal members from being displaced transversally, and the front frame 3 maintains a substantially quadrilateral shape.

In the illustrated embodiment, the second end region 302 of each longitudinal member 31, 32 comprises a plurality of said passing-through slots 33, for example two, three or four passing-through slots, which are spaced apart in the longitudinal direction, for example at least one centimetre from one another.

The locking of the cross member 35 on the longitudinal members 31, 32 is obtained by means of screws, bolts, or other anchoring systems 59, which are inserted within holes 34, which can be also threaded, made vertically at end region 302 of the longitudinal members 31, 32 at each passing-through slot 33, and which engage corresponding holes 37, which can be also threaded, made on the ends of the cross member 35. In particular, the upper part of the end of the cross member 35 comprises series of holes 37, which can be also threaded, to allow a locking for different transverse distances between the two longitudinal members 31, 32, as well as for each passing-through slot 33 of the longitudinal members 31, 32.

In practice, the front frame 3 is arranged to support the cross member 35 at a plurality of preset positions that are spaced apart in the longitudinal direction and are defined by the passing-through slots 33. The possibility to choose the passing-through slot 33 in which the cross member is inserted 35 allows to adjust the longitudinal distance between the cross member 35 and the passenger compartment cell 2, that is, to adjust the length of the front frame 3. This is useful for adapting the size of the front frame 3 and its structural rigidity according to the characteristics, for example, of the propulsion system, transmission, traction, ancillary systems of the car, and trim (handling), etc. that will be installed and set on/in the front frame 3.

According to another aspect of the present disclosure, each longitudinal member 31, 32 is provided with at least a first attaching assembly for attaching a respective suspension 7 of a wheel of the car. In particular, this first attaching assembly is a plate 53. Since the suspension 7 has four arms 71, there are provided four first attaching assemblies, four plates 53 positioned on the outer side of the longitudinal member 31, 32.

Said first attaching assemblies are provided for attaching the suspension 7 at a plurality of positions that are spaced apart in the longitudinal direction: each plate 53 has at least one longitudinal set of holes 55, which can be also threaded, having the same diameter and, where present, the same thread, which define respective attaching points of the arm 71 of the suspension by means of screws, or bolts, or other similar anchoring systems. This is useful to allow adjustment of the longitudinal distance of the suspension 7 from the passenger compartment cell 2 and, therefore, to vary the pitch of the car depending on the trim chosen.

The preset positions are at least two, but preferably are in greater numbers, for example ten. The distance of the holes 55 is about 0.5 cm, or even one centimetre or more centimetres. For example, the distance between the extreme positions is 50 cm.

In practice, the plates 53 are pitch-adjusting plates. Each arm 71 is attached to the respective plate 53 pivotally, for example by means of a respective subframe, in such a way that the arm 71 can rotate with respect to plate 53 about a longitudinal horizontal axis, as is required for a suspension of a wheel for a motor vehicle.

Similarly to what already described for the adjustment plate 6, each pitch-adjustment plate 53 can be also double, comprising a first plate attached to the outer side of the longitudinal member 31, 32 and a second plate 15 attached to the inner side of the longitudinal member, with holes 55, which can be also threaded, aligned with each other.

Each longitudinal member 31, 32 is further provided with a second attaching assembly for attaching a member of a dampening system of the respective wheel, such as a telescopic shock absorber 75 with helical spring or a linkage of the dampening system of the suspension (for example, push rod o pull rod).

This second attaching assembly is positioned on the face of the top or on a side of the longitudinal member 31, 32, and is arranged for attaching the dampening member 75 at a plurality of preset positions that are spaced apart longitudinally. In particular, the second attaching assembly of the chassis 1 includes a plate 57 attached to the top face of the longitudinal member. The plate 57 has at least one longitudinal set of holes 58, which can be also threaded, having the same diameter and, where present, the same thread, which define respective attaching points of a subframe of dampening member 75 by means of screws, bolts or other similar anchoring systems. This is useful to allow an adjustment of the longitudinal distance of the attaching point of the dampening member 75 from the passenger compartment cell 2, both to vary the trim and to take account of the positioning of the suspension 7. In essence, one end of the shock absorber 75 is attached to the longitudinal member 31, 32 via the plate 57, while the other end of the shock absorber 75 is attached to the suspension 7. Alternatively to an attachment or welding, the plates 53, 57 can be also realized from a unique casting with the respective longitudinal member 31, 32 or be an integral part of the latter.

The rear frame 4, or adjustable rear subframe, includes two longitudinal member 41, 42 and a cross member 45, or front crossbar. Each longitudinal member 41, 42 has a first end region 401 that is attached to the passenger compartment cell 2, in particular to the rear transverse beam 26, and a second end region 402 that supports the cross member 45. In the illustrated embodiment, the rear frame 4 is substantially identical to the front frame 3 as regards the structure, the adjustable attachment of the passenger compartment cell 2, and the possibility of adjusting and the attaching modes for the rear suspensions and the dampening system. Indeed, the rear frame 4 can be realized with the same pieces as the front frame 3 and in the same size.

Consequently, the rear frame 4 is not described in greater detail and reference is made to the above, mutatis mutandis.

Obviously, during the assembly of the chassis 1, the selected adjustments for the front frame 3 may differ from the settings chosen for the rear frame 4, according to the specific needs of trim, choice of the propulsion system, traction, transmission, etc.

The present disclosure also relates to a car, in particular a sports car, which comprises a chassis 1.

During the construction of the car, the chassis 1 is precisely mounted according to selected engine, transmission, strength, structure, installation of ancillary system solutions.

In particular, a value of the track width for the car is selected. The longitudinal members of the respective adjustable frame 3, 4 are attached to the passenger compartment cell 2, through the anchor plate 5 and adjustment plate 6 system, at a position that is related to the value of the track width selected: the transverse distance between the longitudinal members is calculated by subtracting the transverse bulk of the suspensions from the value of the track width.

If necessary, the front track width may be selected with a different value from the rear track width.

Also by selecting a value of pitch, the suspensions 7 are attached to the respective longitudinal members of the adjustable frame 3, 4 via the pitch-adjustment plate 53 system at positions that are related to the value of selected pitch, in such a way that the distance between the axes of the wheels is as desired. The shock absorbers are attached to the plates 57 at appropriate positions, as well as to the respective suspensions 7.

Then the assembly of the other components of the car (the propulsion system, tanks, driving system, instrumentation, body, interiors, etc.) is carried out on the chassis, to obtain a finished car.

The object of the present disclosure is susceptible of numerous modifications and variations, all of which falling within the protective scope of the appended claims.

The invention claimed is:

1. A Chassis for a motor vehicle, comprising a passenger compartment cell, a front frame and a rear frame, which are arranged along a longitudinal direction of the chassis, the passenger compartment cell being interposed between the front frame and the rear frame, the chassis having a transverse direction that is orthogonal to the longitudinal direction, wherein at least one among the front frame and the rear frame is an adjustable frame, the adjustable frame comprising two longitudinal member and a cross member, which form a substantially C-shaped structure, each longitudinal member having a first end region, which is attachable to the passenger compartment cell and a second end region, which is adapted to support the cross member the chassis being arranged for the attaching of each longitudinal member to the passenger compartment cell at a plurality of positions that are spaced apart in the transverse direction, in such a way as to allow an adjustment of the transverse distance between the two longitudinal members.

2. The chassis according to claim 1, the passenger compartment cell comprising a transverse beam on which the two longitudinal member of the adjustable frame can be attached, wherein the first end region of each longitudinal member comprises an anchor member and the transverse beam comprises a plurality of seats adapted to receive the anchor member, each of said seats defining a respective preset position of the longitudinal member; or the transverse beam comprises an anchor member and the first end region of each longitudinal member comprises a plurality of seats adapted to receive the anchor member, each of said seats defining a respective preset location of the longitudinal member.

3. The Chassis according to claim 1, wherein the passenger compartment cell comprises a transverse beam on which the two longitudinal member of the adjustable frame can be attached, the first end region of each longitudinal member comprising an anchor plate, the transverse beam comprising an adjustment plate for each longitudinal member, the anchor plate being attachable at a plurality of predefined positions on the adjustment plate, the adjustment plate being provided with a plurality of holes or seats suitable to receive fastening members such as screws, bolts or the like.

4. The Chassis according to claim 1, wherein the adjustable chassis is arranged to support the cross member at a plurality of positions that are spaced apart in the longitudinal direction, so as to allow adjustment of the longitudinal distance between the cross member and the passenger compartment cell.

5. The Chassis according to claim 1, wherein the second end region of each longitudinal member comprises at least one passing-through slot which is adapted to receive a respective end of the cross member, the cross member being slidable within the passing-through slot during the adjustment of the transverse distance between the two longitudinal members.

6. The Chassis according to claim 5, wherein the second end region of each longitudinal member comprises a plurality of said passing-through slots, each passing-through slot defining a respective preset position of the cross member.

7. A Chassis for car, comprising a passenger compartment cell, a front frame and a rear frame, which are arranged along a longitudinal direction of the chassis, the passenger compartment cell being interposed between the front frame and the rear frame, the chassis having a transverse direction that is orthogonal to the longitudinal direction, in which at least one of the front frame and the rear frame comprises two longitudinal members, each longitudinal member being provided with at least one first attachment assembly for attaching a suspension of a respective wheel of the motor vehicle, said at least one first attaching assembly being adapted for attaching the suspension at a plurality of positions that are spaced apart in the longitudinal direction, in such a way as to allow an adjustment of the longitudinal distance of the suspension from the passenger compartment cell.

8. The Chassis according to claim 7, wherein each longitudinal member is provided with a second attaching assembly to attach a member of a dampening system of the respective wheel of the motor vehicle, said second attaching assembly being arranged for attachment of the member of a dampening system at a plurality of preset positions that are spaced apart in the longitudinal direction.

9. The Chassis according to claim 7, wherein said at least one first attaching assembly and/or said second attachment assembly are plates provided with a plurality of holes adapted to receive fastening members such as screws, bolts, or the like.

10. The Chassis according to claim 7, wherein the adjustable chassis allows an adjustment of the transverse distance between the two longitudinal members, and an adjustment of the longitudinal distance of the suspension from the passenger compartment cell.

11. The Chassis according to claim 7, wherein both the front frame and the rear frame are adjustable frames and/or are provided with said at least one first attaching assembly, the transverse distance between the two longitudinal members and/or the longitudinal distance of a suspension from the passenger compartment cell being adjustable for both the front frame and the rear frame.

12. A motor vehicle comprising a chassis according to claim 1.

13. Method to construct a motor vehicle comprising the steps of:
   taking a chassis according to claim 1;
   selecting a value of the track width to the vehicle;
   attaching the two longitudinal members of the adjustable frame to the passenger compartment cell at a position that is related to the value of the selected track width.

14. Method to construct a motor vehicle comprising the steps of:
   taking a chassis according to claim 7;
   selecting a pitch value for the motor vehicle;
   attaching the suspensions to the respective longitudinal members provided with said first attachment assemblies at position that is related to the value of the selected pitch.

15. A motor vehicle comprising a chassis according to claim 7.

* * * * *